(12) United States Patent
Bates et al.

(10) Patent No.: US 6,270,704 B1
(45) Date of Patent: Aug. 7, 2001

(54) METHODS OF FORMING BODIES OF EXPANDABLE FOAMING MATERIAL

(75) Inventors: William Andrew Bates, Huntersville; Roland Vann Lanier, Jr., Belmont, both of NC (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/260,725

(22) Filed: Mar. 2, 1999

(51) Int. Cl.$^7$ ................................................ B29C 44/06
(52) U.S. Cl. ................ 264/46.4; 264/46.9; 264/DIG. 48
(58) Field of Search .................... 264/45.1, 46.4, 264/46.9, 252, DIG. 48

(56) References Cited

U.S. PATENT DOCUMENTS

| | | | |
|---|---|---|---|
| 4,957,672 | * | 9/1990 | Carter et al. ........................ 264/46.4 |
| 4,975,229 | * | 12/1990 | Kita et al. ............................ 264/45.1 |
| 5,106,397 | * | 4/1992 | Jaroszczyk et al. .................... 55/270 |
| 5,660,771 | * | 8/1997 | Dunfee et al. ....................... 264/46.4 |

* cited by examiner

Primary Examiner—Allan R. Kuhns
(74) Attorney, Agent, or Firm—Millen, White, Zelano & Branigan, P.C.

(57) ABSTRACT

In order to decrease the height of a solid foam body produced from a pool of foaming liquid as the foaming liquid solidifies into the solid body, the height of a bottom mold face is decreased by sloping the mold face so that there is less liquid at higher locations of the mold face than at lower locations. This technique is especially useful in making seals for filter elements, wherein the filter elements are annular in horizontal cross-section so that less sealing material occurs adjacent the downstream clean side of the filter media comprising the filter element than adjacent the upstream dirty side of the filter media. In a particular application, a filter element with a frustoconical filter media has one end sealed by a rising volume of solidifying urethane foam so that more foam is adjacent the outside surface of the filter media than the inside surface, and so that the foam also forms a peripheral gasket adjacent the outside surface. In this way, a filter element is provided which has more uniform air flow when used as an air filter with an internal combustion engine. This improves the mass transfer function of the filter and thus engine performance and exhaust emissions.

11 Claims, 4 Drawing Sheets

METHODS OF FORMING BODIES OF EXPANDABLE FOAMING MATERIAL

FIELD OF THE INVENTION

The present invention is directed to methods of forming bodies of expandable foam material and a filter element seal formed by using that method and, more particularly, the present invention is directed to such a method and seal useful in configuring air filter elements.

BACKGROUND OF THE INVENTION

In air filters which are used for internal combustion engines, it is important to have substantially uniform air flow. This is because non-uniform air flow adversely affects the mass transfer function of the air stream, which decreases engine performance and raises exhaust emissions. In air filters, such as annular air filters, and more particularly, frustoconical air filters which are annular in cross-section, it has been found that reducing the height of a urethane seal adjacent the downstream clean side of the air filter improves air flow uniformity substantially. However, the prior art does not suggest just how this can be accomplished in an economical, feasible manufacturing process.

It is to be kept in mind that even a slight increase in engine performance and reduction in exhaust emissions is of considerable importance when that slight improvement is spread over an entire fleet of automotive vehicles. This is because that slight improvement, when combined with other slight improvements, eventually provides a substantial overall improvement which decreases fuel consumption of the fleet as well as harmful exhaust emissions of the fleet.

Generally, seals and gaskets formed on conical air filters are made of expanded urethane. It has been found that when attempting to lower the blow height of the urethane on the inside diameter of the filter media, sufficient flow or pressure from the foaming action is needed on the outside diameter of the filter media to form a blemish-free seal against a radial portion of a top mold. Moreover, since the outside diameter of the urethane flow is mechanically restricted and controlled, while the inside diameter is unrestricted, blow height is adversely impacted by the water content of polyol and the ratio of polyol to isocyanate, as well as other variables.

In an attempt to solve such difficulties, a number of methods were investigated which included manually restricting the blow on the inside, processing the urethane at different polyol to isocyanate ratios and different mold temperatures, and changing the chemistry of the urethane in order to reduce the blow. These methods failed due to either blemishes which formed on the outside diameter which forms the gasket for the filter element and/or high blow heights at the inside diameter of the filter element.

SUMMARY OF THE INVENTION

It is a feature of the invention to provide a new and improved method of forming bodies of expanded materials and of making and configuring seals for filter elements, wherein if the expanded materials are used for sealing air filters, air filters result which have improved air flow uniformity and thus an advantageous mass transfer function so as to enhance engine performance and reduce exhaust emissions.

In one aspect, the present invention is directed to a method for controlling the height differential in a mold utilizing a liquid starting material in which, as the liquid starting material solidifies into a solid body, it cures on a slanted mold face. By slanting the mold face from a first reference location to a second reference location which is beneath the first reference location, the liquid cures into a solid wherein the height of the volume of solid material is greater at the second reference location than at the first reference location.

In a further aspect of the invention, the liquid is a chemically or mechanically blown material such as urethane, plastisol, or silicone, which rises as it solidifies into a foamed solid volume which is higher at the second reference location than at the first reference location with respect to an imaginary horizontal plane through the solid body.

In a further aspect, the method is utilized for forming a seal for a pleated filter media having an upstream dirty side and a downstream clean side wherein the solid body forms a seal at an end of the filter media which is higher at the upstream dirty side than at the downstream clean side.

In still a further aspect of the invention, an annular filter element has at least one end sealed by a foam seal which extends to a greater axial height on the upstream dirty side than the downstream clean side.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
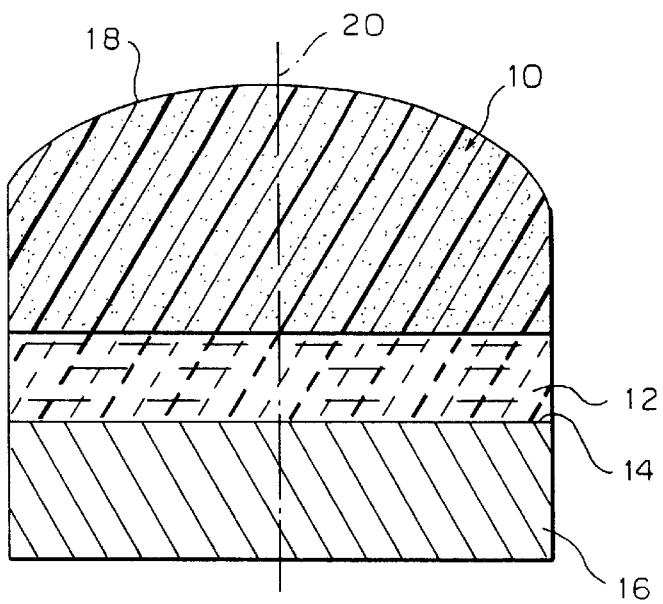
FIG. 1 is a side elevation of a portion of a bottom mold, according to the prior art, with liquid urethane thereon which expands into a solid foam body.

Referring now to FIG. 1, there is shown a prior art arrangement for configuring a body 10 of solid foam material wherein a pool of liquid 12 is disposed on a mold face 14 of a lower mold element 16. As is seen in FIG. 1, the solid body 10 has a domed shape as the liquid 12 cures into a solid. Note that the top surface 18 of the foam body 10 is slightly arcuate with more material concentrated at the center, defined by the line 20, than at the edges.

While other materials are of interest, the particular material under consideration with respect to this patent application which is exemplary of the invention is urethane, which is formed when polyol and isocyanate are mixed. The mixture of polyol and isocyanate are dispensed in a liquid state onto an open mold, and as chemical foaming occurs, the urethane expands 100–300%. To facilitate the reaction, the mold is heated to an elevated temperature above room temperature in the range of about 120° F. to 140° F. The ratio by weight of polyol to isocyanate is in a range of about 1.1/1.0 to 2.5/1.0 with a preferred ratio of about 1.8/1.0.

Figure 2:
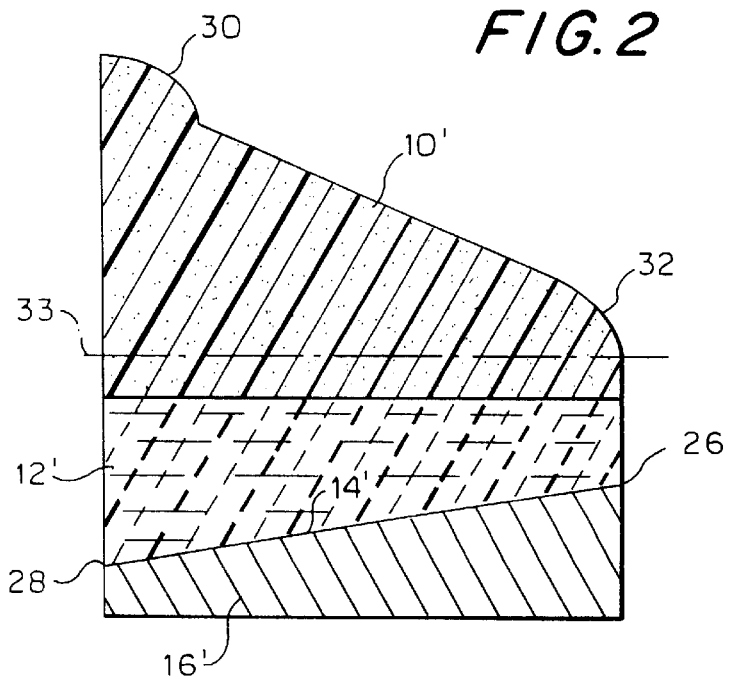
FIG. 2 is a side elevation similar to FIG. 1, but where the mold face has been slanted in a first direction in a accordance with the principles of the present invention.
Figure 3:
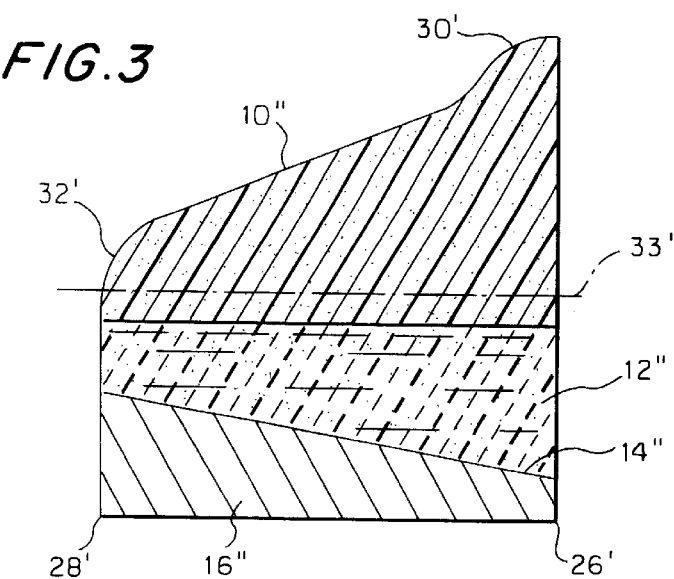
FIG. 3 is a side elevation similar to FIG. 2, but where the mold face has been slanted in a second direction opposite the first direction.

Referring now to FIGS. 2 and 3 which disclose the method of the present invention in a broad aspect, it is seen that mold faces 14' and 14", respectively, are slanted in opposite directions so that there are first locations 26 and 26' which are higher than second locations 28 and 28' because the mold faces 14' and 14" slope from the first locations to the second locations. When the urethane liquid pools at 12' and 12" foam as the polyol and isocyanate mixture solidifies and cures into solid bodies 10' and 10", it is seen that the resulting solid bodies have slanting top surfaces 20' and 20". This is because the greater volumes of liquid at and near the second locations 28 and 28' provide greater volumes of material to foam and solidify. Thus, there are peaks 30 and 30' which are higher than low points 32 and 32' with respect to imaginary planes 33 and 33' through the bodies 10' and 10". The high points 30 and 30' have a slight rounded hump with a slight increase in volume, while the low points 32 and 32' slope downwardly with a slight decrease in volume. Thus, there is provided a method for controlling the height differentials between low and high points of a solid body produced by a mold.

Figure 4:
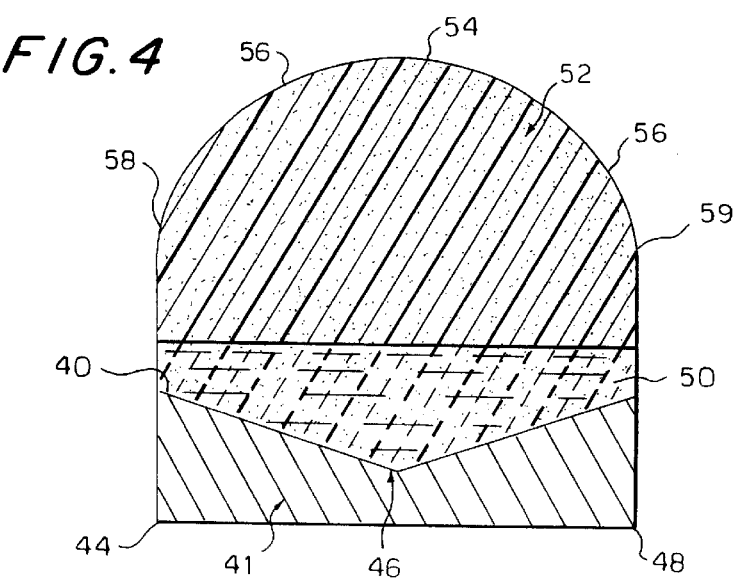
FIG. 4 is a side elevation showing a concave mold face.
Figure 5:
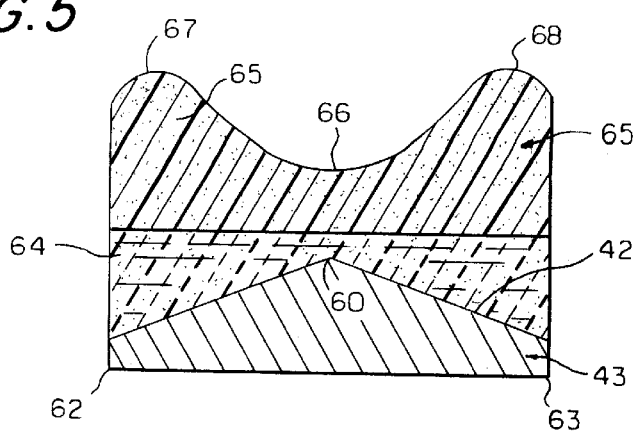
FIG. 5 is a view similar to FIG. 4, but showing a mold face which is convex.

Referring now to FIGS. 4 and 5, the invention is shown providing a concave mold face 40 on a mold 41 and a convex mold face 42 on a mold 43, respectively. With respect to the concave mold face 40, there is a first location 44, which is relatively high, and a second location 46, which is beneath the first location. The convexity is achieved by a third location 48 higher than the second location 46, which third location results in a pool of liquid 50 which has a greater volume at the second location 46 than at the first and third locations 44 and 48 because the mold face 40 of the mold 41 slopes inwardly. Consequently, as the liquid 50 foams and solidifies, it cures into a body 52 which has a peak 54 adjacent the second location 46 with a surface 56 that slopes both toward the first location 44 and the second location 48. Again, this is because there is a greater volume of liquid adjacent the second location 46 than at the first and third locations 44 and 48, respectively. Moreover, adjacent the locations 44 and 48, the surface 56 has a gradually increasing downward slope and rounded portions 58 and 59 indicative of less material occurring at the first and third locations 44 and 48.

Referring now specifically to FIG. 5, it is seen that the convex mold face 42 of the mold 43 has its first location 60 above a second location 62 and a third location 63. Consequently, the pool of liquid 64 has a smaller volume at the location 60 than at the location 62 and 63. This results in an expanded foam solid body 65 which is concave having a valley 66 between two peaks 67 and 68. Again, this is because the volume of liquid increases from the high location 60 to the lower locations 62 and 63.

Figure 6:
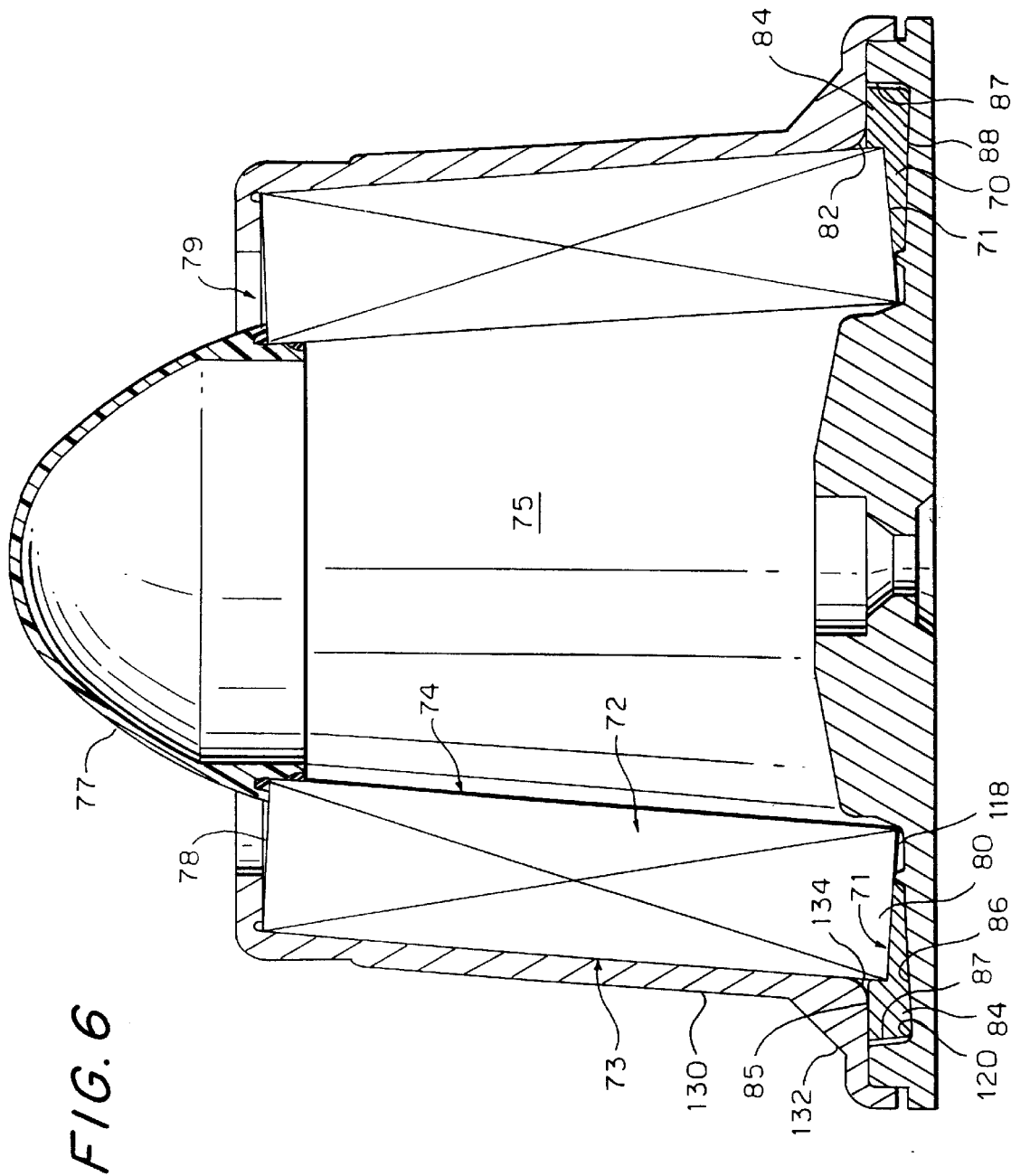
FIG. 6 is a side elevation showing a mold with a filter element therein having a seal and a gasket at the bottom end thereof and formed thereon in accordance with the principles of the present invention.
Figure 7:
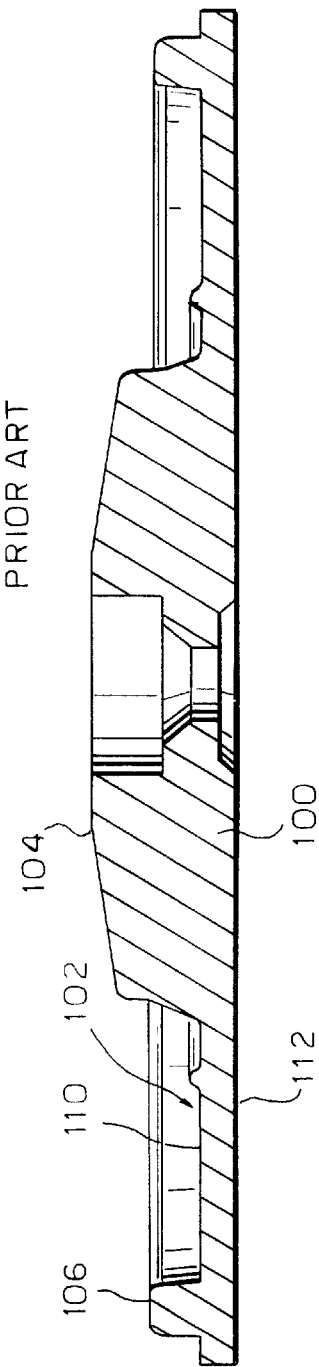
FIG. 7 is an elevation of a prior art lower mold used in the production of a filter element of the type improved by the present invention.
Figure 8:
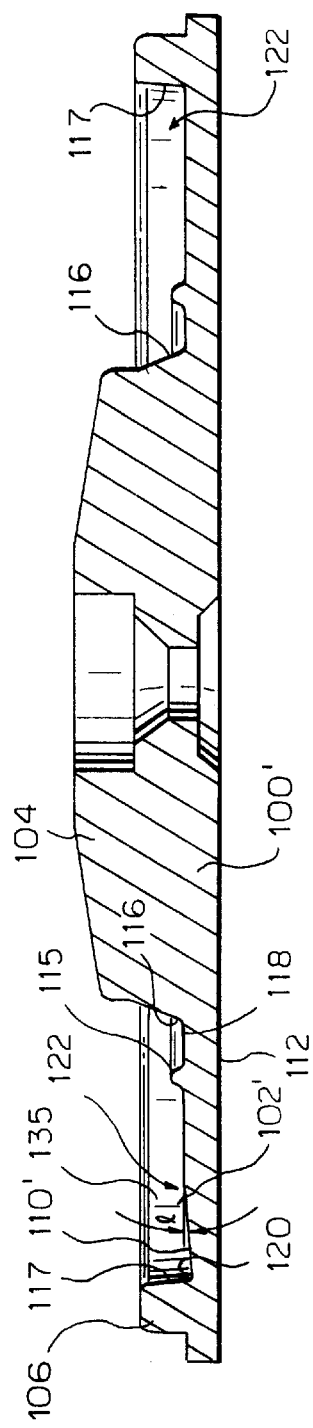
FIG. 8 is a view similar to FIG. 6, but showing a lower mold configured in accordance with the present invention.

Referring now to FIGS. 6–8, there is shown in FIG. 6 a specific application of the principles of the present invention to molding an annular seal 70 to the lower end 71 of a frustoconical, pleated filter media 72 having an outer dirty side 73 and inner clean side 74, which clean side faces a hollow core 75. The pleated filter media 72, sealed by the seal 70, includes a domed end cone 77 which fits within the hollow core 75 at the upper or second end 78 to form a filter element 79. Filter element 79 has a configuration similar to that of the filter element of U.S. Pat. No. 5,106,397, incorporated herein by reference. The seal 70 of the filter element 79 has a sealing portion 80 which penetrates and seals the lower end 71 of the filter media 72, which sealing portion 80 tapers from the outer dirty side 73 of the filter media toward the inner clean side 74. The top surface 82 slopes radially inwardly. Extending radially outward is a gasket portion 84 of the seal 80 which seals with the housing (not shown) in which the air filter 79 is mounted. The gasket portion 84 has an upper surface 85 and a lower surface 86, as well as a peripheral surface 87. The lower surface 86 is coextensive with the entire lower surface 88 of the sealing element 70.

The method and apparatus for forming the seal 70 has similarities to those described in U.S. Pat. No. 5,660,771, incorporated herein by reference, which uses the prior art approach shown in FIG. 7 wherein a bottom mold 100 has a trough 102 disposed between a central hub 104 and an annular rim 106. In the prior art, the trough 102 has a horizontal mold face 110 which is horizontal to the bottom surface 112 of the bottom mold 100, which in turn rests upon a horizontal surface. Accordingly, when liquid is poured or otherwise placed in the trough 102, it has the same level across the trough 102 and has the generally rectangular cross-section of the pool of liquid 12 shown in FIG. 1. Consequently, as the liquid in the trough 102 rises, it tends to have the cross-section of the solid body 10 of FIG. 1 and is as high on the upstream clean side 74 of the filter 72 as it is on the downstream dirty side 73 of the filter media. As has been pointed out in the Background of the Invention, this results in non-uniform air flow when the filter element 79 is used as in the disclosure of U.S. Pat. 5,106,397.

Referring now to FIG. 7 in conjunction with FIG. 8, it is seen in FIG. 7 that the mold face 110 is now sloped at an acute angle $\alpha$ to form a slanted mold surface 110'. The angle $\alpha$ is in the range of about 0.5° to about 10° and preferably in the range of 1° to 6°, with a preferred slope of about 2°. A support 115 for the filter media 79 (FIG. 6) is positioned between the outer surface 116 of the hub 104 and the inner surface 117 of the annular rim 106. A first relatively high location 118 secures at the juncture of the axial surface 116 of the rim and the sloping floor defined by the mold face 110'. As is seen from FIG. 8, the mold face 110' slopes from the first location 118 to a second location 120, which is lower than the first location. Consequently, when a pool of liquid 122 is placed in the trough 102' configured in accordance with the present invention with the downwardly sloping mold face 110', more liquid accumulates adjacent the second, lower location 120 than adjacent the first higher location 118.

As previously stated, the liquid is a mixture of polyol and isocyanate or any other foam type material which, as it cures into a solid foam to form the seal 70 of FIG. 6, rises and increases its volume by 100–300%. As is seen in FIG. 6, a top mold 130 has a radial portion 132 with a downwardly facing radial surface 134. The downwardly facing radial surface 134 cooperates with the mold face 110' of the first mold 100 to define an annular space 135 in which the liquid 122 expands to form the gasket 84. The gasket 84 has a thickness or height in the axial direction which may be greater than the portion 80 of the gasket which seals the end 71 of the pleated media 72.

The top mold 130 (see FIG. 6) and the bottom mold 100' (see FIG. 8) are heated within a range between 120° F. and 140° F. which is substantially above ambient temperature or room temperature during the expansion of the liquid pool 122 to form the seal 70.

In essence, the urethane which forms the seal 70 blows higher to form the gasket 84 than to form the seal 80 in which it has unrestricted free rise due to the expandable liquid material being initially provided at a larger volume as the height of the mold face 110' increases.

From the foregoing description, one skilled in the art can easily ascertain the essential characteristics of this invention, and without departing from the spirit and scope thereof, can make various changes and modification of the invention to adapt it to various usages and conditions.

We claim:

1. A method of forming a seal for a pleated filter media having an upstream dirty side, a downstream clean side, and an end joining the sides, comprising:

juxtaposing the end of the pleated filter media with a mold face of a blow mold wherein the end extends between the downstream clean side and upstream dirty side of the filter media;

slanting the mold face at an acute angle with respect to the horizontal to increase the distance between the mold face and the end of the filter media between the downstream clean side and the upstream dirty side;

providing a pool of liquid on the slanting mold face, which liquid expands as it cures into a solid body, whereby the height of the solid body is greater at the upstream dirty side of the filter media than at the downstream clean side of the filter media.

2. The method of claim 1, wherein the liquid is liquid urethane which rises as it solidifies into a foamed solid volume which is higher at the dirty side than the clean side.

3. The method of claim 1, wherein the liquid comprises a mixture of polyol and isocyanate which cures to form a formed microcellular solid body which is higher with respect to an imaginary horizontal plane therethrough at the dirty side than the clean side.

4. The method of claim 1, wherein the liquid is a blow mold liquid which rises with respect to the mold face as the liquid solidifies during curing to form a solid body which is higher at the dirty side than the clean side.

5. The method of claim 1, wherein the mold face is heated to a temperature level exceeding room temperature, which temperature level is maintained for at least a period while the liquid solidifies into the solid volume.

6. The method of claim 1, wherein the liquid is a mixture of polyol and isocyanate and the mold face is heated to a temperature in the range of about 120° F. to 140° F., wherein the liquid solidifies as it cures into a solid body which is higher at the dirty side that the clean side with respect to a horizontal plane therethrough.

7. The method of claim 1, wherein the filter media is annular with the dirty upstream side being an exterior surface and the clean downstream side being an inner surface.

8. The method of claim 7, wherein the acute angle is in the range of about 0.5° to 10.0°.

9. The method of claim 1, wherein the acute angle is in the range of about 1.0° to 6.0°.

10. The method of claim 1, wherein the acute angle is about 2°.

11. The method of claim 8, wherein the mold face extends radially beyond the upstream dirty side of the filter media and further includes an axially extending portion spaced from the upstream dirty side of the filter media; wherein there is a top mold with a radial portion that overlies the radial outboard portion of the mold face to define an annular space therebetween, and wherein the method includes expanding the liquid in the annular space as the liquid cures into a solid to form an annular sealing gasket.

* * * * *